United States Patent [19]

Langford, Jr.

[11] Patent Number: 4,934,467
[45] Date of Patent: Jun. 19, 1990

[54] DRILL BIT WEAR RESISTANT SURFACE FOR ELASTOMERIC SEAL

[75] Inventor: James W. Langford, Jr., Red Oak, Tex.

[73] Assignee: Dresser Industries, Inc., Dallas, Tex.

[21] Appl. No.: 279,523

[22] Filed: Dec. 2, 1988

[51] Int. Cl.⁵ ............................................. E21B 10/22
[52] U.S. Cl. .................................. 175/371; 175/374; 277/96.2; 384/94; 384/95; 384/282
[58] Field of Search ............... 175/367, 371, 370, 374, 175/372; 384/92, 94, 95, 282; 277/81 R, 82, 96.2, 189.5

[56] References Cited

U.S. PATENT DOCUMENTS

| | | | |
|---|---|---|---|
| 3,467,448 | 9/1969 | Galle | 384/94 |
| 3,761,145 | 9/1973 | Schumacher, Jr. | 384/94 |
| 3,922,038 | 11/1975 | Scales | 175/374 |
| 4,012,238 | 3/1977 | Scales | 175/374 |
| 4,102,838 | 7/1978 | Scales | 148/16.5 |
| 4,188,242 | 2/1980 | Scales | 148/16.5 |
| 4,199,156 | 4/1980 | Oldham et al. | 384/94 |
| 4,207,658 | 6/1980 | Sorenson | 29/149.5 PM |
| 4,213,656 | 7/1980 | Olschewski et al. | 384/94 |
| 4,248,485 | 2/1981 | White et al. | 384/95 |
| 4,253,710 | 3/1981 | Goodman | 384/94 |
| 4,295,654 | 10/1981 | Kawamura et al. | 277/96.2 |
| 4,343,479 | 8/1982 | Fukuoka et al. | 277/96.2 |
| 4,368,788 | 1/1983 | Drake | 175/374 |
| 4,386,969 | 6/1983 | Kilbert | 277/96.2 |
| 4,552,233 | 11/1985 | Klima | 384/94 |
| 4,600,064 | 7/1986 | Scales et al. | 175/369 |
| 4,618,269 | 10/1986 | Badrak et al. | 384/94 |
| 4,655,851 | 4/1987 | Loos | 148/6 |
| 4,753,303 | 6/1988 | Burr | 175/372 |
| 4,753,304 | 6/1988 | Kelly, Jr. | 175/371 |

OTHER PUBLICATIONS

Caterpillar Tractor Co. brochure illustrating Duo--Cone Seals, dated Jun. 1985.

Primary Examiner—Bruce M. Kisliuk

[57] ABSTRACT

An improved drill bit seal arrangement, including a seal ring having a boronized outer annular surface which is fabricated separate and apart from the journal bearing structure of the drill bit arm. The seal ring boronized surface is polished to define a smooth non-abrading surface for the elastomeric seal. The seal arrangement enhances the wear resistance of the seal between the drill bit arm and the cutting cone, thereby increasing the life span of the drill bit.

17 Claims, 2 Drawing Sheets

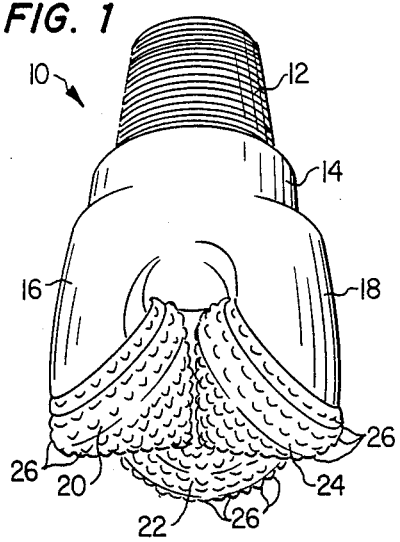
FIG. 1
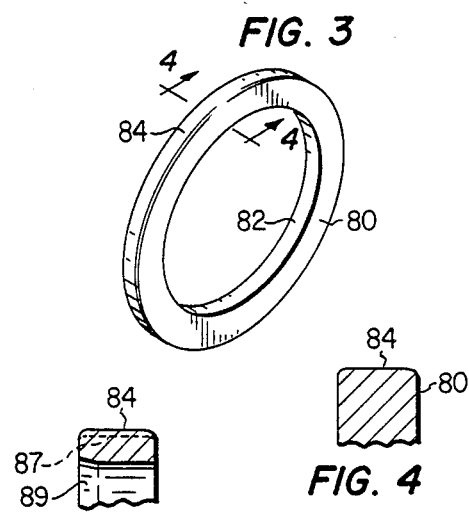
FIG. 3
FIG. 4
FIG. 7
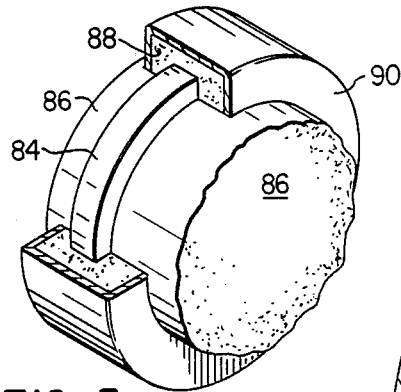
FIG. 5
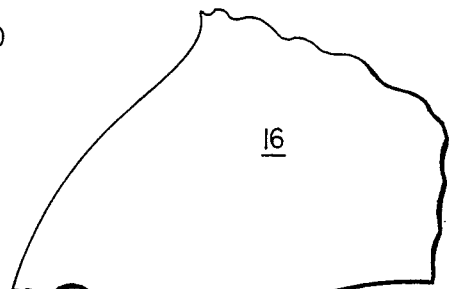
FIG. 2
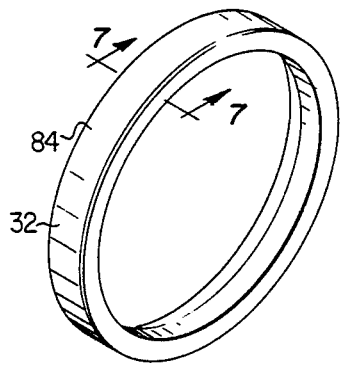
FIG. 6
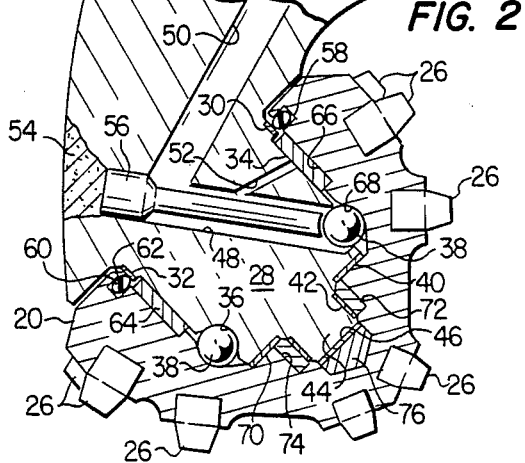

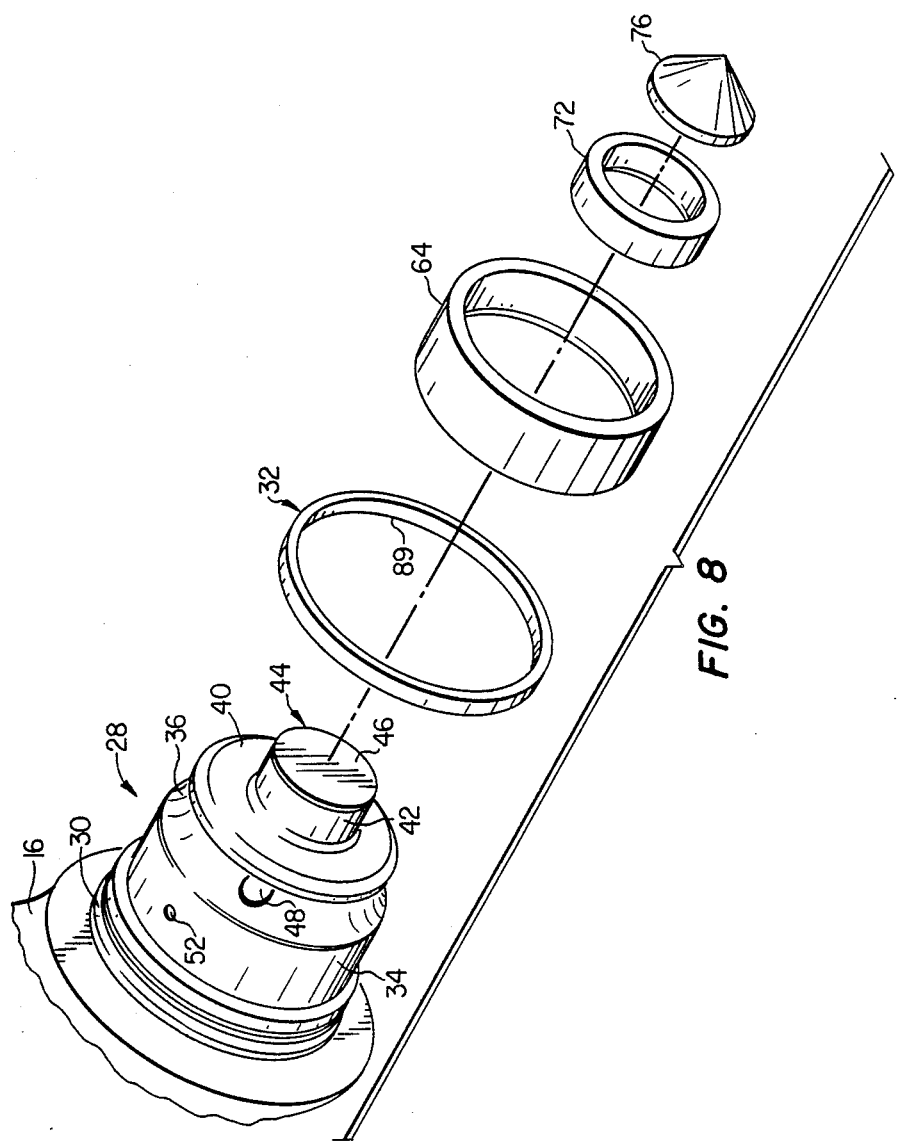

DRILL BIT WEAR RESISTANT SURFACE FOR ELASTOMERIC SEAL

TECHNICAL FIELD OF THE INVENTION

The present invention relates in general to hydrocarbon drill bit structures and methods of fabrication thereof, and more particularly relates to techniques for constructing hardened surfaces for sealing with elastomeric elements of the drill bit.

BACKGROUND OF THE INVENTION

The fabrication of drill bits utilized in hydrocarbon drilling is a highly refined and competitive field. Drill bits utilized for boring wells many thousands of feet, and even miles, into the earth are required to be extremely effective and highly reliable to reduce the time necessary to drill such bore holes. It can be appreciated that with nominal drilling expenses of about $5,000 an hour, any down time required to repair or change a drill bit can be extremely costly.

The standard earth boring drill bit includes three arms connected to a threaded stem, with each arm supporting a toothed cone rotating thereon. Thus, as the bit is turned by the drill string, the toothed cones also rotate individually to grind a bore hole through the earth formation and thereby drill the well. An area of constant concern with such drill bits is that of the bearing surfaces and the fluid seal which must be maintained between the toothed cone and the arm.

U.S. Pat. No. 4,207,658, assigned to Dresser Industries, discloses a drill bit with special wear resistant bearing surfaces between the toothed cone and the drill bit arm to increase the life span and reliability of the bit. An internal static lubrication system is formed between each toothed cone and arm of the drill bit to provide the required lubrication during the rotary action of the drill bit. An O-ring type of elastomer generally provides a seal between the toothed cone and the drill bit arm to isolate the internal lubrication system from the harsh environment of the bore hole. A long-lasting and reliable seal is often difficult to achieve, in view that the drill bit operates continuously in an abrasive environment of drill mud and earth formation chips, as well as operating in caustic chemicals which are often injected into the well.

The life of drill bits have been extended by the development of various techniques for providing hardened bearing surfaces between the toothed cone and the drill bit arm. U.S. Pat. Nos. 4,655,851; 4,012,238; 4,102,838; 4,188,242 and 3,922,038 disclose techniques for fabricating extremely hard bearing surfaces to thereby extend the life of the drill bits. Particularly, carburizing and boronizing techniques are disclosed in the noted patents for achieving a highly wear resistant bearing surface. U.S. Pat. No. 4,248,485, assigned to Dresser Industries, illustrates yet another refinement in the drill bit art, in which hardened inlaid areas are formed in the journal bearing arm to also extend the life of the drill bit. A wear resistant and antigalling bearing disclosed in the noted U.S. Pat. No. 4,207,658 provides an excellent combination of a hardened bearing surface and a porous matrix bearing to enhance the life span of the bit.

Attempts continue to be made to improve the quality of the seal between the toothed cones and the drill bit arms. The seal surface on the drill bit arm is preferably constructed with a hardened surface so that the constant rotation of the elastomer seal thereon does not wear an annular groove in the surface and reduce the effectiveness of the seal. In the noted U.S. Pat. No. 4,655,851, an enclosure structure and technique is disclosed so that the seal surface can be carburized, while the bearing surfaces are boronized. While attempts have been made to boronize the seal surface itself to provide a wear resistant surface, the resulting rough surface tends to wear the elastomeric seal. In addition, boronizing the seal surface requires additional heat treatment and thus more process steps.

It can be seen that a need exists for an improved drill bit seal arrangement which can extend the life of the drill bit, without compromising the quality of the bearing surfaces. An associated need exists for a fabrication technique for constructing the seal apparatus separate and apart from the journal bearing surface, such that each process and resulting structure can be optimized.

SUMMARY OF THE INVENTION

In accordance with the present invention, the disclosed drill bit seal, and method of fabrication thereof, substantially reduces or eliminates the disadvantages and shortcomings associated with the prior art techniques. According to the invention, a separate rigid seal ring is fabricated with a hardened outer surface, and press fit onto the journal bearing part of the drill bit arm for providing an excellent wear resistant surface for use with an elastomeric seal. The technical advantage of this approach is that the material of the seal ring can be constructed of a material different from that of the journal bearing itself, and hardened by various techniques independently of the hardening materials or techniques utilized in fabricating the journal bearing.

According to the preferred form of the invention, the seal ring is machined from a desired cylindrical steel stock to define the desired outer diameter and annular surface shape of the seal ring. The internal portion of the seal ring is not machined to a final internal diameter, but rather retains the diameter of steel stock to provide substantial bulk and thereby reduce warping during subsequent heat treating steps. The outer seal surface can be polished to define a smooth surface in preparation of subsequent hardening of the seal surface. Next, the seal ring is prepared for surface hardening, such as by pack boronizing the seal surface thereof. Only the seal surface is selectively boronized, while the inner structure of the seal ring is not boronized.

Again, after the boronizing of the outer seal surface, such surface is polished to a highly smooth surface such that the elastomeric seal bears against a highly polished and hardened surface to provide an extended life seal. The seal ring is finished by machining the internal diameter to a desired dimension suitable for press fitting on a shouldered area or boss on the base of the journal bearing.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts or elements throughout the views, and in which:

FIG. 1 depicts an earth boring drill bit of the type in which the invention may be advantageously practiced;

FIG. 2 is a partial sectional view of one arm of a multi-arm bit, illustrating the location of the hardened seal ring of the invention together with the other parts of the drill bit;

FIG. 3 is an isometric view of the seal ring which is partially machined and ready for surface hardening;

FIG. 4 is a cross-sectional view of a portion of the seal ring shown in FIG. 3;

FIG. 5 is an isometric view of the seal ring as it is prepared for surface hardening by packing techniques;

FIG. 6 is an isometric view of the seal ring of the invention after surface hardening and machining is completed;

FIG. 7 is a partial sectional view of a portion of the seal ring of FIG. 6; and

FIG. 8 is an exploded view showing the seal ring and associated bearings removed from the journal bearing part of the drill bit arm.

DETAILED DESCRIPTION OF THE INVENTION

FIG. 1 illustrates an earth boring drill bit of the type in which the invention can be advantageously practiced. The drill bit 10 conventionally includes a threaded stem 12 formed integral with a body 14 having three arms, two of which are depicted as reference characters 16 and 18. Rotatably mounted to each drill bit arm are respective toothed cutting cones 20, 22 and 24. Embedded within each cutting cone are a number of tungsten carbide teeth 26, each of which could also be milled steel teeth. The teeth 26 are constructed of a material of extreme hardness so as to grind or erode the earth's formation for long periods of time without substantially wearing the drill bit itself. As can be appreciated by those skilled in the art, when the drill bit 10 is threadably fixed to the bottom of a tubular drill string, and when the drill string is rotated, the drill bit arms also rotate and carry with them the individually rotating cutting cones 20-24. Such a drill bit presents an effective way of boring holes into the earth's crust, which is often formed of granite or other hard rocks, to many thousands of feet below the surface of the earth.

While the drill bit 10 is rotated by the drill string, a drill mud is circulated through the drill string down through the drill bit to carry the cutting chips upwardly in the annulus of the bore hole. The drill mud itself carries cutting chips and thus is abrasive, as are the rocks and earth chips which are ground away by the toothed cutting cones 20-24. This presents a harsh environment from which the bearings and sealing surfaces within the drill bit 10 must be protected. To that end, and to be described in more detail below, the drill bit 10 includes within each arm a static lubrication system for providing lubricating grease to the various bearing surfaces to extend the life of the drill bit. In addition, a seal is provided between each drill bit arm and its associated toothed cutting cone to prevent the drill mud, and often other caustic chemicals, from entering the internal parts of the toothed cutting cones.

With reference now to FIG. 2, there is shown a partial sectional view of one cutting arm 16 and a toothed cutting cone 20 rotatably mounted thereto. The other drill bit arms and associated toothed cutting cones are similarly constructed. Machined at the end of the drill bit arm 16 is a journal bearing structure 28 which provides a support for the various bearings and the seal structure for rotatably mounting and sealing the cutting cone 20 to the arm 16. The journal bearing 28 has formed at its base a seal boss 30 providing an interference fit to the seal ring 32 of the invention fitted thereover.

The journal bearing 28 also includes a primary bearing surface 34 which may be carburized or boronized to provide a wear resistant surface. The primary bearing surface 34 can be constructed with a hardened surface formed by an inlaid deposit of tungsten carbide material, or other hardening materials or agents suitable for such purpose. An annular concave recess is formed in a central part of the journal bearing structure 28 to provide a race 36 for accommodating a number of ball bearings 38. The race 36 can also be hardened according to conventional techniques and materials. A thrust bearing area 40 is shown as an annular inlaid hardened area for providing a thrust bearing area against which a surface of the cutting cone 20 can rotate. A secondary bearing surface 42, also of the inlaid type, is shown formed annularly around a stub portion 44 of the journal bearing structure 28. The end of the stub 44 is also provided with a thrust bearing surface 46 which is inlaid with a hardened bearing material.

A conduit 48 is formed in the journal bearing structure 28 in communication with a conduit 50 formed within the arm 16 of the drill bit 10. In this manner, the drill bit 10 can be initially charged with a lubricant which is captured within the drill bit arms, and which can flow through the conduit system to the various bearings of the drill bit 10. Particularly shown is a conduit 52 branched from conduit 48 for supplying the lubricant to the primary bearing surface 34. During assembly of the drill bit 10, and before being charged with a lubricant, the conduit 48 provides a passageway for channeling the ball bearings 38 and placing them between the journal bearing race 36 and the cutting cone 20. Of course, the conduit 48 provides a reservoir of the lubricant to the ball bearings 38 during drilling when the cutting cone 20 is rotating with respect to the drill bit arm 16. The ball bearings 38 are loaded into the journal bearing race 36 via the conduit 48, by way of an external passageway 54. Once the ball bearings 38 are loaded between the journal bearing race 36 and the cutting cone 20, the external passageway 54 is welded shut with a metal plug 56. While shown in simplified form for purposes of clarity, a rod structure extends from the plug 56 to prevent the ball bearings 38 from falling back into the conduit 48 during operation of the drill bit 10. Plug 56 also caps the conduit 50 to prevent lubricating fluid from exiting the internal captured system of the drill bit.

The internal construction of the cutting cone 20 and the various bearings are next described. The cutting cone 20 has formed near its open end an internal annular groove 58 for receiving therein an O-ring type of elastomeric seal 60. The rotating cutting cone 20 carries with it the elastomeric seal 60 so that an annular rounded surface of the elastomeric seal 60 rubs on the hardened and polished surfaced of the seal ring 32. The elastomeric seal 60 is held in compression against the outer hardened surface of the seal ring 32, thereby defining a fluid seal interface 62 for preventing both the lubricant from exiting the internal system of the drill bit 10 and for preventing abrasive drill mud and caustic fluids from entering the internal parts of the drill bit 10. It can be appreciated that when the lubricating system within the drill bit is contaminated with abrasives, or when the lubricant is lost due to a worn seal interface 62, the various bearings seize very quickly and render the drill bit 10 unusable. As a result, the entire drill string is required to be pulled to the surface to replace the drill bit, which operation can take many hours, especially when drilling many thousands of feet below the surface of the earth.

A powder metal matrix bearing 64 fits within a machined area 66 of the cutting cone 20 for providing a large bearing which rotates on the primary bearing surface 34 of the journal bearing structure 28. Also formed within the cutting cone 20 is an annular bearing race 68 which, together with the journal bearing race 36 provides a torus-shaped annular cavity for holding the ball bearings 38. When the ball bearings 38 are inserted into the torus-shaped annular cavity, the cutting cone 20 becomes rotatably mounted and fixed to the drill bit arm 16. The cutting cone 20 is further provided with a machined and polished annular thrust bearing surface 70 which cooperates with the inlaid journal thrust bearing surface 40. A smaller diameter powder metal matrix bearing 72 is fixed within a machined area 74 of the cutting cone 20 for providing a bearing cooperating with the journal inlaid bearing surface 42 formed around the stub 44. Lastly, a hardened thrust bearing button 76 is held within the cutting cone 20 for providing a thrust bearing which cooperates with the inlaid thrust bearing surface 46 of the journal bearing structure 28. The various noted bearings operate in the lubricant within the internal cavity of the cutting cone 20. The construction of the powder metal matrix bearings 64 and 72 are described in more detail in U.S. Pat. No. 4,207,658. The construction of the various inlaid bearings noted above are described in more detail in U.S. Pat. No. 4,248,485, the disclosures of both patents of which is incorporated herein by reference.

As can be seen from the foregoing, the art of constructing drill bits, and especially the various bearing surfaces, is highly refined to provide optimum performance and operating life of the drill bit. While the various bearings have been described in conjunction with hardened inlaid structures formed on the journal bearing 28, those skilled in the art may prefer to utilize carburized, boronized, nitriding, stainless steel or other hardening agents such as described in U.S. Pat. Nos. 3,922,038 and 4,188,242, and other patents noted above.

It can also be appreciated by those working in this art that in order to realize the benefits and advantages of optimized drill bit bearing structures, the seal between the cutting cone 20 and the drill bit arm 16 must also be reliable to maintain the internal lubricating system isolated from the abrasive and caustic environment surrounding the drill bit as it fractures the earth formation. Experience has shown that after a conventional drill bit has been operating for about 60–100 hours, the elastomeric seal wears an annular groove within a seal surface formed integral with the journal bearing structure. This is due primarily to the elastomeric seal which carries with it the abrasive drill mud and thereby wears an annular groove within the journal seal surface. In practice, the formation of the wear groove by the elastomeric seal occurs notwithstanding the provision of a hardened journal bearing seal surface, such as by carburizing. As noted above, attempts to boronize such a seal surface tends to roughen the seal surface, thereby degrading the life span of the elastomeric seal.

According to an important feature of the invention, the seal ring 32 is constructed separately from the journal bearing structure 28, and can thereby be optimized with regard to hardening and wear resistance, without concern as to the processes required in fabricating the journal bearing structure 28 itself. According to the invention, the seal ring 32 is press fit onto the boss 30 machined at the base of the journal bearing structure 28. The interference fit is preferable to prevent the leakage of fluids between the seal ring 32 and the journal bearing structure 28 and to fix the parts together to prevent relative rotation therebetween. Of course, those skilled in the art may find that the seal ring 32 may be fixed to the journal bearing structure 28 by other techniques, such as welding or by an adherent placed between the seal ring 32 and the journal bearing boss 30.

According to a significant feature of the invention, the seal ring 32 is fabricated with an outer hardened surface 84 which is boronized, or otherwise hardened, to provide an excellent wear resistant seal interface 62 to the elastomeric seal 60. While the details of the fabrication of the seal ring 32 are described below, it is to be noted here that the outer surface of the seal ring 32 is polished to provide an extremely smooth surface which eliminates the roughening inherently existing after the boronizing process. As a result, a significant improvement is achieved in providing a highly wear resistant surface about which the elastomeric seal 60 rotates.

With reference now to FIGS. 3–7, there is illustrated the seal ring of the invention as it undergoes the various steps of fabrication thereof. In fabricating the seal ring 32 of the invention, steel is selected, such as AISI-4815 or EX30 and machined to form a ring 80 of sufficient bulk to resist warping during fabrication. The steel is selected to produce the desired hardness and resistance to abrasion when heat treated. Other stock materials can be utilized in fabricating the seal ring 32 of the invention. The inside diameter of the steel material is bored or drilled sufficiently to provide adequate cross-sectional thickness so that the noted warping is prevented. The outer surface 84 is machined to the desired shape, such as shown in FIG. 4 to provide a slight crown to the outer surface 84, and to remove the sharp corners. Other shapes can be machined into the outer surface of the seal ring to accommodate different types of elastomeric seal rings to provide a high quality seal interface. The outer diameter of the ring 80 is machined to a final dimension and polished by a fine grit sand paper to provide a smooth surface.

Next, the ring 80 is prepared for packing to boronize the outer surface 84 thereof. Shown in FIG. 5 is exemplary packing apparatus, including an isolation material 86 disposed on opposing planar side surfaces of the ring 80 so that only the outer peripheral surface 84 to be boronized is exposed. A boron-containing compound 88 is then packed around the outer surface 84 of the ring 80, in intimate contact with the exposed surface 84. The boron-containing material 88 is maintained in contact with the disc surface 84 by a annular container 90. The boronizing material and steps are well known in the art, and thus all the details thereof need not be set forth herein. Those skilled in the art will readily recognize that in order to form a boronized surface of a desired depth in the exposed area 84 of the ring 80, well known boronizing compounds, temperatures and time durations can be carried out to achieve the desired hardened and wear resistant surface on the ring 80. In addition, the invention is not to be limited to surface hardening by boronization, but rather other case hardening techniques such as carburizing, nitriding, etc. are also contemplated. In any event, because the seal ring 32 is fabricated separate and apart from the journal bearing structure 28 of the drill bit, case hardening materials and techniques particularly well suited for seal surfaces can be utilized, which materials or techniques may not otherwise be desirable or advantageous in fabricating the journal bearing structure 28. In addition, the seal ring 32 can be fabricated concurrently with the journal bearing 28 of the drill bit so that any additional or different steps required in fabricating the seal ring do not extend the overall time required for constructing the drill bit 10.

When the desired surface hardening of the ring 80 is achieved, the packing and isolation apparatus is removed. Because the ring 80 is incomplete, having substantial material around a small internal diameter, such ring is not subject to warping during the high temperature phase of the boronizing step. In addition, the opposing side surfaces of the ring 80 are not subjected to the boronizing environment, and thus are not hardened. Accordingly, the ring 80 is again machined to form a desired internal diameter, such as shown in FIG. 6. Since the internal part of the ring 80 is not hardened by the boronizing process, such part can be easily machined to the final internal diameter.

As noted in FIG. 7, an annular chamfer 89 is machined on an inner edge surface of the seal ring 32 for facilitating the interference fit thereof on the journal bearing boss 30. The broken line 87 in FIG. 7 illustrates the depth by which the boronizing process has hardened the surface 84 of the seal ring 32. Preferably, a depth of about 0.005-0.010 inch is sufficient to provide a hardened surface for sealing to the elastomeric O-ring 60. Finally, the outer seal surface 84 is polished by a fine grit sand paper, or the like, to provide a very smooth surface. A surface finish of 45 microinch RMS, or less, is preferable to reduce abrasion of the elastomeric seal 60. Such a smoothing operation can be carried out any time after the outer surface thereof has undergone the boronizing step.

Referring now to FIG. 8, there is shown in exploded form the journal bearing structure 28 and associated seal ring 32 and powder metal matrix and hardened bearings. As noted above, the journal bearing structure 28 includes at the base thereof the seal ring boss 30 having an outer diameter providing an interference fit with the seal ring 32. The chamfer 89 on the leading edge of the seal ring 32 enables it to be initially centered on the boss 30 and then forced thereon. The powder metal matrix primary bearing 64 provides a bearing rotatable around the journal bearing surface 34. Lubricant conduit 52 allows a flow of lubricating fluid between the bearing surface 34 and the powder metal matrix bearing 64. As noted above, the ball bearings 38 are arranged around the race 36, via the lubricating channel 48. The secondary powder metal matrix bearing 72 is rotatable around the inlaid bearing surface 42 located on the stub 44 of the journal bearing structure 28. An edge surface of the secondary powder metal matrix bearing 72 can provide a relief for axial thrust forces exerted by the inlaid surface 40 of the journal bearing structure 28. The hardened thrust bearing button 76 provides thrust relief against the inlaid bearing surface 46, formed at the end of the stub 44. Powder metal matrix bearings 72 and hardened tool steel bearing 76 are rotatable about inlaid bearing surfaces on the journal bearing structure 28, and are lubricated by the lubricant which fills the general cavity within the cutting cone 20. Although the powder metal matrix bearings shown in FIG. 8 are separate from the cutting cone 20, such bearings are, in practice, press fit into machined areas within the cutting cone 20.

From the foregoing, disclosed is an improved seal fabrication technique for extending the life of the seal arrangement between the cutting cone and the journal bearing part of a drill bit arm. The overall technical advantage of the invention is that the life of the drill bit is extended, and thus interruptions in the drilling operation itself are reduced. These advantages are chiefly obtained by constructing a seal ring, separate and apart from the drill bit journal bearing structure, and providing an extremely hard and wear resistant surface on the seal ring. Preferably, a boronizing process is utilized to provide a hardened surface on the seal ring so that continued pressure of the elastomeric seal thereon does not wear a groove in the ring and reduce the effectiveness of the seal. Importantly, a boronized surface is polished to an extremely smooth seal surface to further reduce the wear tendencies on the elastomeric seal. An important technical advantage of the seal arrangement of the invention is that a seal ring can be made by process steps separate and apart from the journal bearing of the drill bit, thereby enhancing the flexibility by which the seal surface can be fabricated and hardened.

While a preferred embodiment of the invention has been disclosed with reference to a specific seal ring construction, and the method of fabrication thereof, it is to be understood that many changes in detail may be made as a matter engineering choices, without departing from the spirit and scope of the invention, as defined by the appended claims.

What is claimed is:

1. In a drill bit having a plurality of arms for rotatably supporting a corresponding plurality of toothed cutting cone structures, an improved fluid seal structure, comprising:
   an annular boss formed on each said drill bit arm;
   a plurality of rigid seal rings, each having a seal surface and each rigid seal ring being fabricated separate from said drill bit arms, said seal surface of each said rigid seal ring having a hardened surface to enhance wear characteristics thereof and having respective internal dimensions adapted to be interference fit to a respective said drill bit arm boss; and
   an elastomeric seal adapted to be held within each said cutting come structure and for conforming around the hardened seal surface of an associated said seal ring such that a long-lasting and wear resistant seal is formed between said drill bit arms and said cutting cone structures when relative rotational movement between said elastomeric seal and an associated said rigid seal ring is occasioned during a drilling operation.

2. The improved drill bit of claim 1, wherein said seal surface of each said seal ring is polished to provide a smooth surface.

3. The improved drill bit of claim 1, wherein said seal surface of each said seal ring has a boronized hardened surface which is polished to define a wear resistant and non-abrading surface.

4. The improved drill bit of claim 1, further including an annular groove formed in an inner surface of each said cutting cone structure for receiving therein said elastomeric seal such that when said cone structure is rotatably mounted to said arm, said elastomeric seal is pressed in a sealing fit around the seal surface of said rigid seal ring.

5. The improved drill bit of claim 1, wherein each said rigid seal ring includes a generally flat outer hardened surface which extends annularly around said ring, and an inner annular surface which is hardened to a lesser degree.

6. An earth formation drill bit having a rotatable cutting cone structure, comprising:
    at least one arm for rotatably supporting said cutting cone structure, said arm having an annular boss at a base of said arm;
    an annular rigid seal ring having an outer hardened surface to enhance wear characteristics thereof, and being fittable on said arm boss; and
    an annular elastomer fittable between said cutting cone and said hardened surface of said seal ring and adapted to rotate with said cutting cone such that said elastomer rotates with respect to the hardened surface of said seal ring and provide a fluid seal between said drill bit arm and said cutting cone structure.

7. The drill bit of claim 6, wherein said cutting cone has an inner annular groove for receiving therein said elastomer.

8. The drill bit of claim 6, wherein said seal ring has a boronized outer annular surface.

9. The drill bit of claim 8, wherein said boronized surface is polished to define a smooth non-abrading surface.

10. The drill bit of claim 6, wherein said seal ring has an outer annular surface which is hardened to an extent greater than inner annular surface thereof.

11. The drill bit of claim 6, wherein said drill bit further includes a journal having a bearing surface hardened according to a first hardening process to form a journal bearing surface having a defined hardened characteristic, and wherein said seal surface is hardened according to a different process to form a seal surface having different hardened characteristic.

12. In a drill bit having at least one arm to which a cutting cone is rotatably mounted, the improvement comprising an all-metal seal ring fabricated separate from said arm and press fit around a raised boss on a journal bearing structure of said arm, said seal ring having a hardened and polished annular surface area for providing a wear resistant seal surface against which an elastomeric seal is pressed to provide a fluid seal between said drill bit arm and said rotatable cutting cone, and an inner part of said seal ring is characterized as being hardened to a lesser degree.

13. The improved drill bit of claim 12, further including an annular groove in said cone for receiving therein said elastomeric seal.

14. The improved drill bit of claim 12, wherein an outer annular surface of said seal ring is boronized to provide a case hardened surface.

15. A seal ring adapted for use in a drill bit for providing a fluid seal between an elastomer seal associated with a cutting cone which is rotatably mounted to an arm structure of said drill bit, comprising:
    an annular rigid all-metal ring having an internal diameter adapted for press fitting to said drill bit arm, an outer surface adapted for engaging said elastomer seal, said outer surface being boronized so as to be case hardened to an extent greater than an inner surface of said seal ring to enhance the wear resistant characteristics between said elastomeric seal and said rigid seal ring, and said boronized surface being polished to provide a nonabrading interface with said elastomeric seal, and further including a chamfered edge for facilitating pared fitting thereof onto said drill bit arm.

16. A drill bit having an improved fluid seal for sealing lubricant cavities within the bit, comprising:
    a plurality of arms carried by a threaded stem, each said arm having a toothed cutting rotatably mounted to a journal bearing;
    each said journal bearing a boss constructed at a base thereof and having at least one bearing surface hardened to provide extended operation with an associated bearing mounted in said cutting cone;
    a seal ring fabricated independently of said journal bearing and fixed to said boss to prevent movement of said ring during drilling operation, said seal ring having an outer annular surface which is preferentially hardened with respect to other areas of the ring; and
    an elastomeric seal held in an annular groove formed in said cutting cone, said elastomeric seal being pressed against said hardened seal ring surface when said cutting cone is mounted to said journal bearing such that an extended life fluid seal is formed.

17. The drill bit of claim 16, wherein said seal ring and said journal bearings are hardened according to different processes so that bearing surfaces of said journal and said seal ring have different hardened characteristics.

* * * * *

UNITED STATES PATENT AND TRADEMARK OFFICE
CERTIFICATE OF CORRECTION

PATENT NO.   :   4,934,467
DATED        :   June 19, 1990
INVENTOR(S)  :   James W. Langford, Jr.

It is certified that error appears in the above-identified patent and that said Letters Patent is hereby corrected as shown below:

```
Column 8, line 45, change "come" to --cone--.
Column 10, line 26, after "cutting", insert --cone--.
Column 10, line 28, after "bearing", insert --having--.
Column 10, line 22, change "pared" to --press--.
```

Signed and Sealed this

Third Day of March, 1992

Attest:

HARRY F. MANBECK, JR.

*Attesting Officer*   *Commissioner of Patents and Trademarks*